No. 746,962. PATENTED DEC. 15, 1903.
F. HINZE & F. J. WAGNER.
CIRCULATING APPARATUS FOR DIFFUSING CELLS.
APPLICATION FILED AUG. 31, 1903.
NO MODEL.
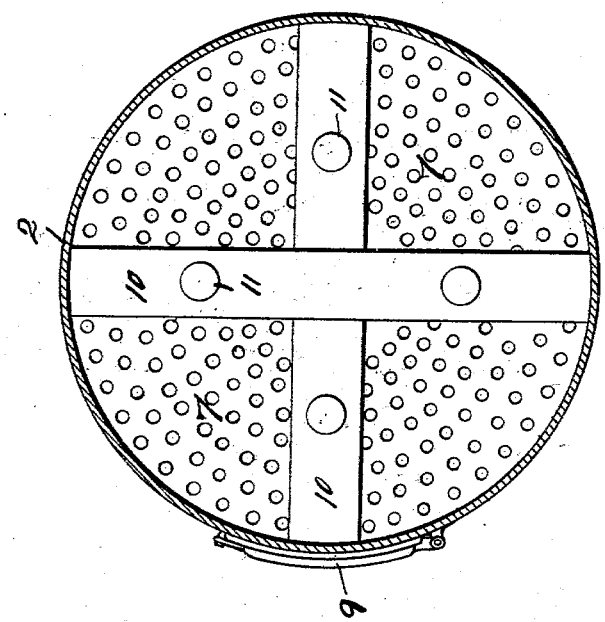
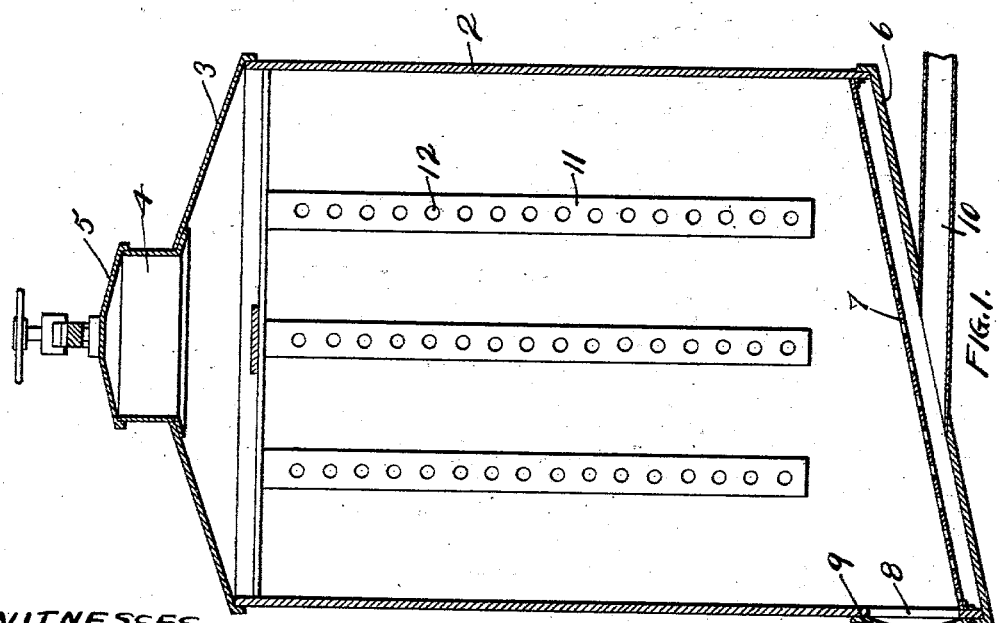
WITNESSES
INVENTORS
FREDERIC HINZE
FREDERIC J WAGNER
BY
Attorneys No. 746,962. Patented December 15, 1903.

UNITED STATES PATENT OFFICE.

FREDERIC HINZE, OF MINNEAPOLIS, AND FREDERIC J. WAGNER, OF ST. LOUIS PARK, MINNESOTA.

CIRCULATING APPARATUS FOR DIFFUSING-CELLS.

SPECIFICATION forming part of Letters Patent No. 746,962, dated December 15, 1903.

Application filed August 31, 1903. Serial No. 171,321. (No model.)

*To all whom it may concern:*

Be it known that we, FREDERIC HINZE, of Minneapolis, and FREDERIC J. WAGNER, of St. Louis Park, county of Hennepin, State of Minnesota, have invented certain new and useful Improvements in Circulating Apparatus for Diffusing-Cells, of which the following is a specification.

In the operation of a beet-sugar plant we have found that the beets have a tendency to pack down in the diffusing or extracting cells, particularly when frozen, and the hot water admitted for the purpose of extracting the saccharine matter from the vegetable roots will flow up along the inside walls of the cell and will extract the juices from the sugar-bearing material near the walls, but will not penetrate to the center of the cell, and consequently the mass of roots at that point comes out of the cell practically untouched by the water and is thrown away and wasted. Furthermore, the attempts of the attendants to force the hot water through the contents of a cell, as where it has been frozen and packed down in thawing, often delays the extracting operation, and thereby greatly increases the cost of production.

The object, therefore, of our invention is to provide an improved circulating apparatus wherein vegetable-juices, particularly those of beet-roots and sugar-cane, can be thoroughly extracted and in a comparatively short space of time.

A further object is to provide a circulating apparatus which will insure the penetration of the liquid to all parts of the cell and its contact with the sugar-bearing material as well when such material has been frozen and packs down in the cell, as when it is in its natural condition.

The invention consists generally in various constructions and combinations, all as hereinafter described, and particularly pointed out in the claims.

In the accompanying drawings, forming part of this specification, Figure 1 is a vertical section of a diffusing-cell embodying our invention. Fig. 2 is a transverse section of the same on the line $x$ $x$ of Fig. 1.

In the drawings, 2 represents a cell of ordinary construction, having the usual top 3, provided with the filling-opening 4 and cover 5. Some of these cells are provided with inclined bottoms 6, such as we have shown herein, above which is a perforated floor 7, whereon the material lies during the operation of extracting the juices and from which it is discharged through an opening 8, normally closed by a door 9. A hot-water-intake pipe 10 is provided leading into the cell 2 through the bottom 6 below the perforate floor. Ordinarily in cells of this kind when vegetable material, such as beet-roots, are placed therein and the hot water allowed to flow into the cell it will pass up along the walls and act on the material near them; but on account of the roots usually packing down into the center, particularly when frozen, the water will not enter the mass sufficiently to come in contact with the material in the middle, and hence this part of the contents of the cell will pass out unaffected by the action of the water. Furthermore, it takes some little time for the water to pass through the material, even around the outside, and when the roots are packed down considerable delay results from the attempts on the part of the operators to force the water through the mass. The extracting operation is thus frequently delayed and the expense of sugar-making increased. To obviate all these difficulties and objections to a diffusing and extracting cell as ordinarily used, we prefer to provide a spider-like frame 10 near the top of the cell and supported by the walls thereof and suspend from said frame a series of vertically-arranged pipes 11, having closed upper ends and open lower ends and a series of perforations 12 in their walls. These pipes depend to a point near the floor 7, but a sufficient distance therefrom to allow the free discharge of the sugar-bearing material free from the cell. We prefer to arrange the pipes, as shown in Fig. 2, around the center of the cell and equally spaced from each other and the cell-walls.

In operation the hot water flowing into the cell through the pipe 10 will rise through the perforations in the floor 7 and flow up the walls, and entering the open lower ends of the pipes 11 will ascend therein, and said pipes being closed at their upper ends will flow out through the perforations 12 and permeate the center of the whole mass of sugar-bearing material, so that all the roots, even those that are packed in a solid mass, will be exposed to the action of the liquid. A considerable saving is thus effected both in material and in the time required to extract the saccharine matter.

We do not wish to confine ourselves to the form of cell shown herein, as very many different styles are employed in the sugar-making industry, nor do we confine ourselves to the number of circulating-pipes used or the manner of suspending them in the cell, as a greater or less number of these pipes may be employed, according to the size and shape of the cell, and their support may be modified in construction without departing from the spirit of our invention.

We claim as our invention—

1. The combination, with a diffusing or extracting cell having suitable intake and discharge openings, of a plurality of pipes suspended within said cell and having closed upper ends and open lower ends, and a series of perforations in their side walls, said pipes being spaced from the walls of said cell and from each other, and their lower ends depending to a point above the bottom of said cell.

2. The combination, with a diffusing and extracting cell provided with intake and discharge openings, of a frame provided within said cell near its upper end, and a series of pipes depending from said frame to a point near the bottom of said cell, said pipes being arranged at equal distances from each other around the center of said cell and having open lower ends and a series of perforations in their side walls, substantially as described.

In witness whereof we have hereunto set our hands this 27th day of August, 1903.

FREDERIC HINZE.
FREDERIC J. WAGNER.

In presence of—
RICHARD PAUL,
S. V. GRIFFIN.